United States Patent
Imoto et al.

(10) Patent No.: US 12,166,781 B2
(45) Date of Patent: *Dec. 10, 2024

(54) ATTACK ANALYZER FOR ACCURATE ESTIMATION OF ATTACK ROUTE

(71) Applicant: DENSO CORPORATION, Kariya (JP)

(72) Inventors: Reiichiro Imoto, Kariya (JP); Masumi Egawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 220 days.

This patent is subject to a terminal disclaimer.

(21) Appl. No.: 17/851,118

(22) Filed: Jun. 28, 2022

(65) Prior Publication Data

US 2023/0007033 A1 Jan. 5, 2023

(30) Foreign Application Priority Data

Jun. 30, 2021 (JP) .................................. 2021-109246

(51) Int. Cl.
*H04L 9/40* (2022.01)
(52) U.S. Cl.
CPC ........ *H04L 63/1425* (2013.01); *H04L 63/145* (2013.01)
(58) Field of Classification Search
None
See application file for complete search history.

(56) References Cited

U.S. PATENT DOCUMENTS

| 2001/0039462 | A1* | 11/2001 | Mendez | G05B 13/026 700/45 |
| 2018/0293891 | A1* | 10/2018 | Troutman | G08G 1/13 |
| 2021/0237665 | A1* | 8/2021 | Tamura | H04L 63/1441 |

FOREIGN PATENT DOCUMENTS

| JP | 2019125344 A | 7/2019 |
| JP | 2020123307 A | 8/2020 |

OTHER PUBLICATIONS

U.S. Appl. No. 17/851,145, filed Jun. 28, 2022 Ryosuke Murakami.

* cited by examiner

*Primary Examiner* — William J. Goodchild
(74) *Attorney, Agent, or Firm* — Harness, Dickey & Pierce, P.L.C.

(57) ABSTRACT

An attack analyzer includes: a security log acquisition unit acquiring a security log including an abnormality detection signal generated by a security sensor mounted on an electronic control device constituting an electronic control system and indicating that the security sensor has detected an abnormality; a failure information acquisition unit acquiring failure information indicating a failure occurred in the electronic control device; a prediction table storage unit storing a prediction table showing a correspondence relationship between a predicted attack route in the electronic control system and a predicted abnormality detection signal predicted to be generated by the security sensor; an attack route estimation unit; and an attack information output unit outputting attack information indicating the attack route.

9 Claims, 10 Drawing Sheets

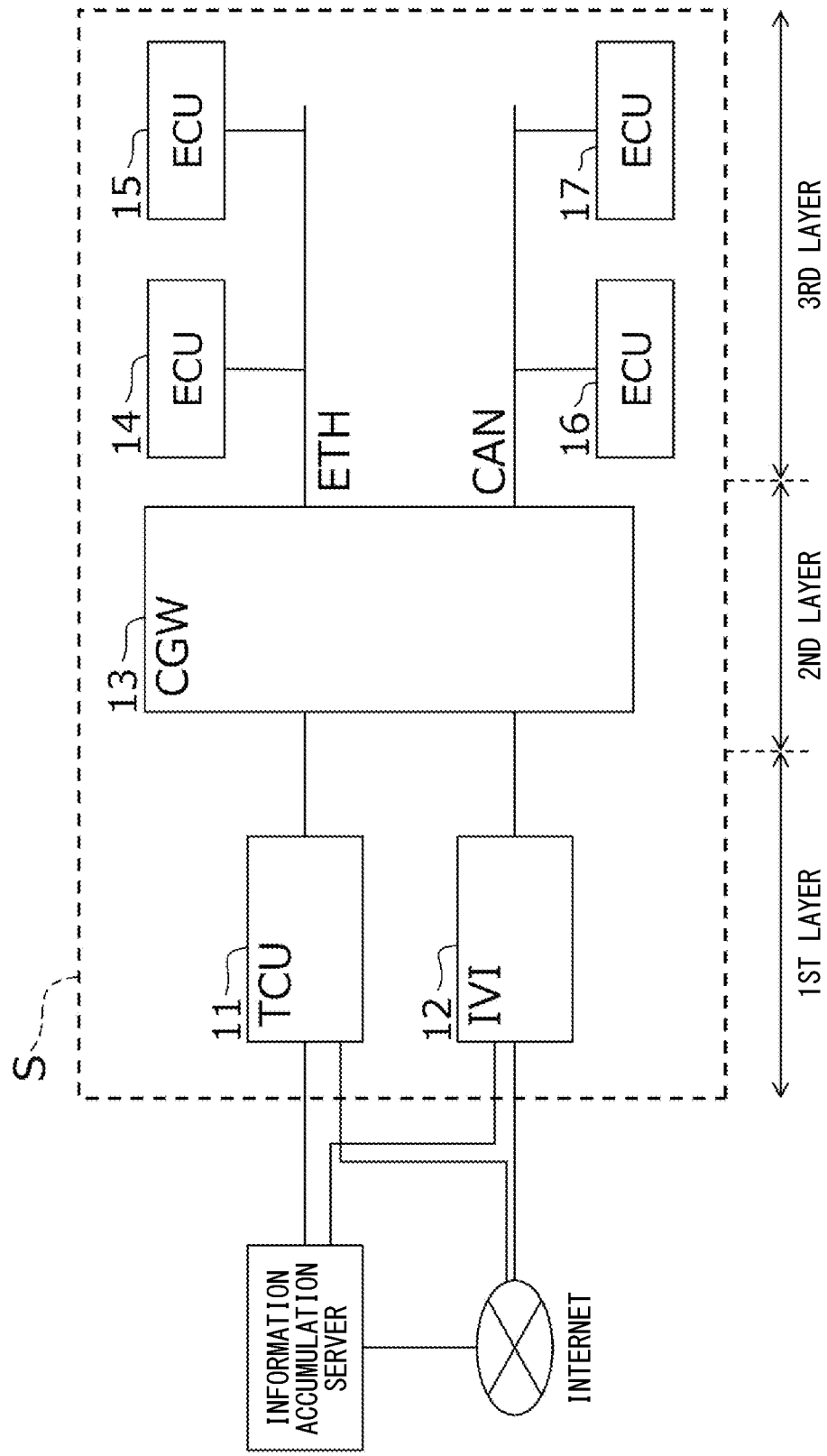

FIG. 4

| EVENT | PREDICTED ATTACK START POINT | PREDICTED ATTACK TARGET | RELEVANT ECU | TCU11 | | CGW13 | | ECU14 | |
|---|---|---|---|---|---|---|---|---|---|
| | | | | SECURITY SENSOR A | SECURITY SENSOR B | SECURITY SENSOR C | SECURITY SENSOR D | SECURITY SENSOR E | SECURITY SENSOR F |
| E1 | EXTERNAL | TCU11 | | 1 | 1 | 0 | 0 | 0 | 0 |
| E2 | TCU11 | CGW13 | | 1 | 1 | 1 | 0 | 0 | 0 |
| E3 | TCU11 | ECU14 | CGW13 | 1 | 0 | 1 | 1 | 0 | 0 |
| E4 | ECU14 | ECU15 | | 0 | 0 | 0 | 1 | 1 | 1 |
| ⋮ | | | | | | | | | |

FIG. 5

| EVENT | PREDICTED ATTACK START POINT | PREDICTED ATTACK TARGET | RELEVANT ECU | RELIABILITY | TCU11 | | CGW13 | | ECU14 | |
|---|---|---|---|---|---|---|---|---|---|---|
| | | | | | SECURITY SENSOR A | SECURITY SENSOR B | SECURITY SENSOR C | SECURITY SENSOR D | SECURITY SENSOR E | SECURITY SENSOR F |
| E1 | EXTERNAL | TCU11 | | 0.5 | 1 | 1 | 0 | 0 | 0 | 0 |
| E2 | TCU11 | CGW13 | | 0.5+α | 1 | 1 | 1 | 1 | 0 | 0 |
| E3 | TCU11 | ECU14 | CGW13 | 0.6+α | 1 | 0 | 1 | 1 | 0 | 1 |
| E4 | ECU14 | ECU15 | | - | 0 | 0 | 0 | 0 | 1 | 0 |
| ... | | | | | | | | | | |

FIG. 6

| EVENT | PREDICTED ATTACK START POINT | PREDICTED ATTACK TARGET | RELEVANT ECU | RELIABILITY | TCU11 | | CGW13 | | ECU14 | |
|---|---|---|---|---|---|---|---|---|---|---|
| | | | | | SECURITY SENSOR A | SECURITY SENSOR B | SECURITY SENSOR C | SECURITY SENSOR D | SECURITY SENSOR E | SECURITY SENSOR F |
| E1 | EXTERNAL | TCU11 | | 0.5 | 1 | 1 | 0 | 0 | 0 | 0 |
| E2 | TCU11 | CGW13 | | $0.5+\alpha$ | 1 | 1 | 1 | 1 | 0 | 0 |
| E3 | TCU11 | ECU14 | CGW13 | $0.6+\alpha+\beta$ | 1 | 0 | 1 | 1 | 0 | 1 |
| E4 | ECU14 | ECU15 | | - | 0 | 0 | 0 | 0 | 1 | 0 |
| ⋮ | | | | | | | | | | |

FIG. 9

| EVENT | PREDICTED ATTACK START POINT | PREDICTED ATTACK TARGET | RELEVANT ECU | RELIABILITY | TCU11 SECURITY SENSOR A | TCU11 SECURITY SENSOR B | CGW13 SECURITY SENSOR C | CGW13 SECURITY SENSOR D | ECU14 SECURITY SENSOR E | ECU14 SECURITY SENSOR F | FAILURE FLAG |
|---|---|---|---|---|---|---|---|---|---|---|---|
| E1 | EXTERNAL | TCU11 | | 0.5 | 1 | 1 | 0 | 0 | 0 | 0 | 0 |
| E2 | TCU11 | CGW13 | | 0.5 | 1 | 1 | 1 | 1 | 0 | 0 | 1 |
| E3 | TCU11 | ECU14 | CGW13 | 0.6 | 1 | 0 | 1 | 1 | 0 | 0 | 1 |
| E4 | ECU14 | ECU15 | | - | 0 | 0 | 0 | 0 | 1 | 1 | - |
| ⋮ | | | | | | | | | | | |

… # ATTACK ANALYZER FOR ACCURATE ESTIMATION OF ATTACK ROUTE

CROSS REFERENCE TO RELATED APPLICATION

The present application is based on and claims the benefit of priority of Japanese Patent Application No. 2021-109246, filed on Jun. 30, 2021, the disclosure of which is incorporated herein by reference.

TECHNICAL FIELD

The present disclosure generally relates to a device that analyzes an attack on an electronic control system mounted on a movable body such as an automobile, including an attack analyzer, an attack analysis method, and an attack analysis program stored on a storage medium.

BACKGROUND INFORMATION

In recent years, technologies for driving support and automated driving control, including V2X such as vehicle-to-vehicle communication and road-to-vehicle communication, have been attracting attention. As a result, a vehicle has a communication function, and so-called connectivity of the vehicle has been promoted. As a result, vehicles are more likely to be subject to cyber attacks such as unauthorized access. Therefore, it is necessary to analyze cyber attacks on vehicles and formulate countermeasures.

SUMMARY

It is an object of the present disclosure to realize an attack analyzer or the like that estimates an attack route with higher accuracy when a cyber attack on an electronic control system is received/observed.

BRIEF DESCRIPTION OF THE DRAWINGS

Objects, features, and advantages of the present disclosure will become more apparent from the following detailed description made with reference to the accompanying drawings, in which:

FIG. 2 is a block diagram illustrating a configuration example of an electronic control system of the first embodiment;

FIG. 4 is an explanatory diagram illustrating a prediction table stored in a prediction table storage unit of the attack analyzer of the first embodiment;

FIG. 5 is an explanatory diagram illustrating a reliability calculation method of a reliability calculation unit according to an example embodiment 1 of the first embodiment;

FIG. 6 is another explanatory diagram illustrating the reliability calculation method of the reliability calculation unit according to the example embodiment 1 of the first embodiment;

FIG. 9 is an explanatory diagram illustrating a method of assigning a flag performed by a flag-assigning unit according to the second embodiment.

DETAILED DESCRIPTION

Embodiments of the present disclosure will be described below with reference to the drawings.

The present disclosure means the disclosure described in the section of claims or means for solving the problem (i.e., Summary section), and is not limited to the following embodiments. Further, at least the words and phrases in quotation marks mean the words and phrases described in the section of claims or means for solving the problem, and are not limited to the following embodiments.

The configurations and methods described in the dependent claims of the claims section are arbitrary (i.e., non-essential) configurations and methods in the disclosure described in the independent terms of the claims. The configurations and methods of the embodiments corresponding to the configurations and methods described in the dependent claims, and the configurations and methods described only in the embodiments that are not described in the claims are arbitrary configurations and methods in the present disclosure. The configuration and method described in the embodiment when the description of the claims is wider than the description of the embodiment is also an arbitrary configuration and method in the present disclosure in the sense that it is an example of the configuration and method of the present disclosure. In either case, the description in the independent claim(s) provides an essential configuration and method of the present disclosure.

Any effects described in the embodiments are effects obtained by a configuration of an embodiment as an example of the present disclosure, and are not necessarily effects of the present disclosure.

When there are multiple embodiments, a configuration disclosed in each embodiment is not limited to each embodiment, but can be combined across embodiments. For example, a configuration disclosed in one embodiment may be combined with other embodiments. Configurations disclosed in multiple embodiments may be collected and combined.

A difficulty described above is not a publicly known matter but is originally found by an applicant of the present application, and is a fact that confirms/proves non-obviousness of the present application together with a configuration and a method described in the present application.

Figure 1A:
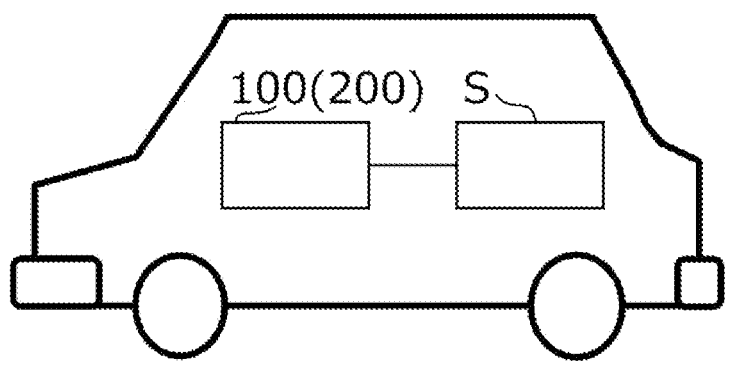
FIGS. 1A and 1B are respectively an explanatory diagram illustrating an arrangement of an attack analyzer according to a first embodiment.
Figure 1B:
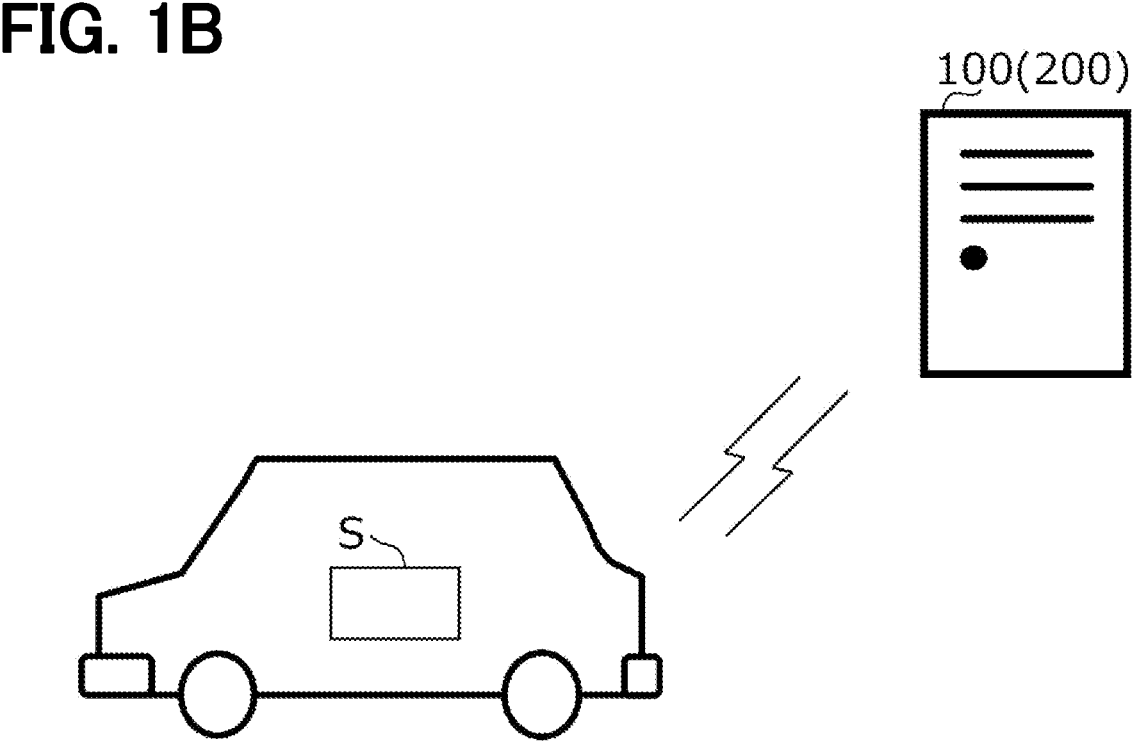

1. First Embodiment (1) Arrangement of an Attack Analyzer 100 and an Electronic Control System S FIGS. 1A and 1B are diagrams illustrating arrangements of the attack analyzer 100 of the present embodiment. The attack analyzer 100 detects a cyber attack on the electronic control system S, and estimates an attack route of the cyber attack received by the electronic control system S. The attack analyzer 100 may take any arrangement/configuration in which necessary information is obtainable from the electronic control system S. Hereinafter, a cyber attack may be abbreviated as an attack. In addition, an attack may be described as abnormality based on a viewpoint of the electronic control system S affected under the attack.

For example, as shown in FIG. 1A, the electronic control system S and the attack analyzer 100 are "mounted" on a vehicle which is a "moving body," and as shown in FIG. 1B, electronic devices are used. It is assumed that the control system S is "mounted" on a vehicle that is a "moving body", and the attack analysis device 100 is realized by a server device installed outside the vehicle.

The "moving body" refers to an object which is movable, and a travel speed thereof is arbitrary. Naturally, the above also includes a case where the movable object is stopped. Examples of the movable body include, but are not limited to, automobiles, motorcycles, bicycles, pedestrians, ships, aircrafts, and objects mounted thereon. Further, "mounted" includes not only a case where it is directly fixed to the movable body but also the case where it is not fixed to the movable body but moves together with the movable body. For example, the above may be a case where a person riding on the movable body carries the object, or a case where the object is mounted in a load placed on the movable body.

In the case of FIG. 1A, the attack analyzer 100 and the electronic control system S are connected by an in-vehicle network such as CAN (Controller Area Network) or LIN (Local Interconnect Network). Alternatively, any communication method such as Ethernet (registered trademark), Wi-Fi (registered trademark), Bluetooth (registered trademark), or the like can be used for connection. As another example, the function of the attack analyzer 100 can be incorporated in at least one of the electronic control devices constituting the electronic control system S.

In the case of FIG. 1A, the attack analyzer 100 can analyze the cyber attack without delay when the electronic control system S is attacked, and can promptly respond to the cyber attack.

In the case of FIG. 1B, the attack analyzer 100 and the electronic control system S are connected by using a communication means consisting of wireless communication methods such as, for example, IEEE802.11 (Wi-Fi (registered trademark)), IEEE802.16 (WiMAX (registered trademark)), W-CDMA (Connect Wideband Code Division Multiple Access), HSPA (High Speed Packet Access), LTE (Long Term Evolution), LTE-A (Long Term Evolution Advanced), 4G, 5G and the like. Alternatively, Dedicated Short Range Communication (DSRC) can also be used. When a vehicle is parked in a parking lot or housed in a repair shop, a wired communication method can also be used instead of the wireless communication method. For example, a LAN (Local Area Network), the Internet, or a fixed telephone line can be used.

In the case of FIG. 1B, when the electronic control system S mounted on a vehicle is attacked, the server device receives, from the vehicle, a security log generated by a security sensor mounted on an electronic control device constituting the electronic control system S, via a wireless communication network. Therefore, as compared with the case where the attack analyzer 100 is mounted on the vehicle, it takes time to analyze the attack and to feed back the analysis result to the vehicle, but it is possible to reduce the processing load on the vehicle. Moreover, since the abundant resources of the server device can be used, it is possible to execute a large amount of complicated arithmetic operations.

As another arrangement, the following example can be considered. The electronic control system S may be mounted not on the vehicle but on a stationary body. Further, the electronic control system S and the attack analyzer 100 may be mounted on different vehicles and communicate directly or indirectly via a base station or the like.

(2) Configuration of an Electronic Control System S (a) Overall Configuration

FIG. 2 is a diagram illustrating a configuration example of the electronic control system S. The electronic control system S includes TCU 11, IVI 12, CGW 13, ECU 14, ECU 15, ECU 16, and ECU 17.

The TCU 11 (Telematics Control Unit) is an electronic control unit (ECU) having a communication function, and transmits/receives information by performing communication via an external information accumulation server or the Internet. The TCU 11 is called as an entry point because it can be an entrance for an attack from the outside by communicating with the outside of the electronic control system S.

The IVI 12 (In-Vehicle Infotainment system) is an ECU that has a function of providing information and entertainment, and also has a communication function similar to that of the TCU 11, and the IVI 12 sends and receives information by communicating via an external information accumulation server or the Internet. Since the IVI 12 also communicates with the outside of the electronic control system S, it can be an entrance for an attack from the outside, so the IVI 12 is also called an entry point.

The CGW 13 (Central GateWay) has, as its main function, a gateway (GW) function. For example, the information received by the TCU 11 or IVI 12 is transferred to the ECUs 14 to 17 connected via an in-vehicle network such as CAN or LIN or a communication network such as Ethernet (ETH). Further, the information transmitted from the ECUs 14 to 17 is transferred to the TCU 11 and the IVI 12. The CGW 13 can also be equipped with a function other than the gateway function. Further, the attack analyzer 100 described later can be mounted as a function of the CGW 13.

ECUs 14 to 17 are ECUs connected to the CGW 13 via a network. In FIG. 2, the ECU 14 and the ECU 15 are connected via Ethernet. The ECU 16 and the ECU 17 are connected via a CAN, which is an in-vehicle network. The ECUs 14 to 17 may be any ECUs that realize each function of the vehicle, which include (i) electronic control devices for the drive system that control the engine, steering wheel, brake, etc., and include (ii) electronic control devices for the vehicle body that control the meters, power windows, etc, and include (iii) electronic control devices for information systems such as a navigation device, and include (iv) electronic control devices for safety control system that perform controls to prevent collision with an obstacle or a pedestrian, for example.

In the following description, when not paying attention to the unique features of the above-mentioned TCU 11, IVI 12, CGW 13, ECU 14, ECU 15, ECU 16, and ECU 17, each of them may be simply referred to as an ECU.

(b) Multi-Layer Defense and Layers

In many electronic control systems S, multi-layer defense is adopted in order to enhance the security against attacks. According to multi-layer defense, security functions are provided hierarchically and in multiple layers as countermeasures against attacks, so that even if one countermeasure (that is, the first layer) is breached in the event of an attack, the next countermeasure (that is, the second layer) can still provide defense against attacks, the defense power of the electronic control system can be enhanced. Therefore, in the electronic control system S that employs multi-layer defense, there are a plurality of layers having different security levels. Therefore, the electronic control system S is divided into a plurality of layers according to the security level, and each ECU is classified into one of those layers.

The electronic control system S shown in FIG. 2 has three layers of defense. In this example, TCU 11 and IVI 12 belong to the first layer, CGW 13 belongs to the second layer, and ECUs 14 to 17 belong to the third layer. The TCU 11 and IVI 12 are ECUs having a communication function with the outside, and these ECUs are equipped with a security function for monitoring data entering the inside of the vehicle from the outside of the vehicle. The area monitored by the ECU having such a security function is the first layer. The CGW 13 is, for example, an ECU having a gateway function equipped with a security function for monitoring data communicated between a network to the ECU connected to the outside of the vehicle and a network to an ECU that controls the vehicle. The CGW 13 takes security measures different from those of the TCU 11 and IVI 12, and the area monitored by the CGW 13 has a security level different from that of the first layer, which is the area protected by the TCU 11 and the IVI 12. Therefore, the area monitored by CGW 13 is set as the second layer. It can be said that the ECUs 14 to 17 are in an area in which only the data that has passed the security function of the CGW 13 is communicated and has a security level different from that of the second layer. Therefore, the area to which the ECUs 14 to 17 belong is set as the third layer.

Although the electronic control system S in FIG. 2 has three layers of defense, four or more layers of defense may be provided. For example, the ECU connected via a sub-gateway ECU may be considered as the fourth layer.

Further, although the hierarchy described in the present embodiment is a physical hierarchy starting from the entry point, a functional hierarchy may be used instead of all or part of the physical hierarchy. For example, there may be a case in which a master-slave relationship is set between ECUs.

(c) Security Sensor

Each ECU constituting the electronic control system S is equipped with one or more security sensors that monitor the inside of the ECU and the network to which the ECU is connected. When the security sensor detects an abnormality that has occurred inside the ECU or in the network, the security sensor generates and outputs a security log. The security log contains an abnormality detection signal indicating that the security sensor has detected an abnormality.

Examples of the security sensor include firewalls, proxies, CAN-IDS, CAN filters, TLS, MAC verification, file access monitoring, secure boot, secure repro(gram), CFI, sandbox, authentication and the like.

In addition to the abnormality detection signal, the security log contains abnormal position information indicating a position where the abnormality detected by the security sensor has occurred, identification information for identifying the electronic control system S, and identification information for identifying the ECU equipped with the security sensor, identification information of the security sensor that detected the abnormality, time when the abnormality was detected, number of times the abnormality was detected, order in which the abnormality was detected, information on data content and IP address (source and destination) received before the abnormality was detected, etc. may be included.

(d) Failure Diagnosis Device

Each ECU constituting the electronic control system S is further equipped with a failure diagnosis device that detects a failure that has occurred in each ECU. While the security sensor described above detects an abnormality by focusing on the security of the vehicle or in-vehicle system, the failure diagnosis device detects troubles that are generated in the ECU itself and the software installed in the ECU regardless of the security. Therefore, the security sensor may be not able to detect a defect that is not determined as be abnormal from the viewpoint of security, but the failure diagnosis device may be able to detect a defect that is not detected by the security software.

The failure diagnostic device is, for example, an in-vehicle diagnostic device (OBD: On-Board Diagnostics). When the OBD detects a failure, it records a failure code called DTC (Diagnostic Trouble Code) according to the detected failure. The OBD detects, for example, that data values exceeding a preset upper limit or lower limit have been input/output, that communication has been interrupted, that the memory of the ECU has not been read normally, and the like, and records a failure code of the corresponding failure.

In the present embodiment, when each ECU receives a request signal requesting failure information from the attack analyzer 100, which will be described later, each ECU transmits failure information indicating a failure that has occurred in the ECU to the attack analyzer 100. However, the ECU may be configured to transmit the failure information to the attack analyzer 100 as soon as the failure diagnosis device detects the failure that has occurred in the ECU.

Each ECU may transmit the failure code recorded by the failure diagnosis device as it is as failure information, or may transmit information indicating that a failure has occurred as failure information.

(3) Configuration of an Attack Analyzer 100

Figure 3:
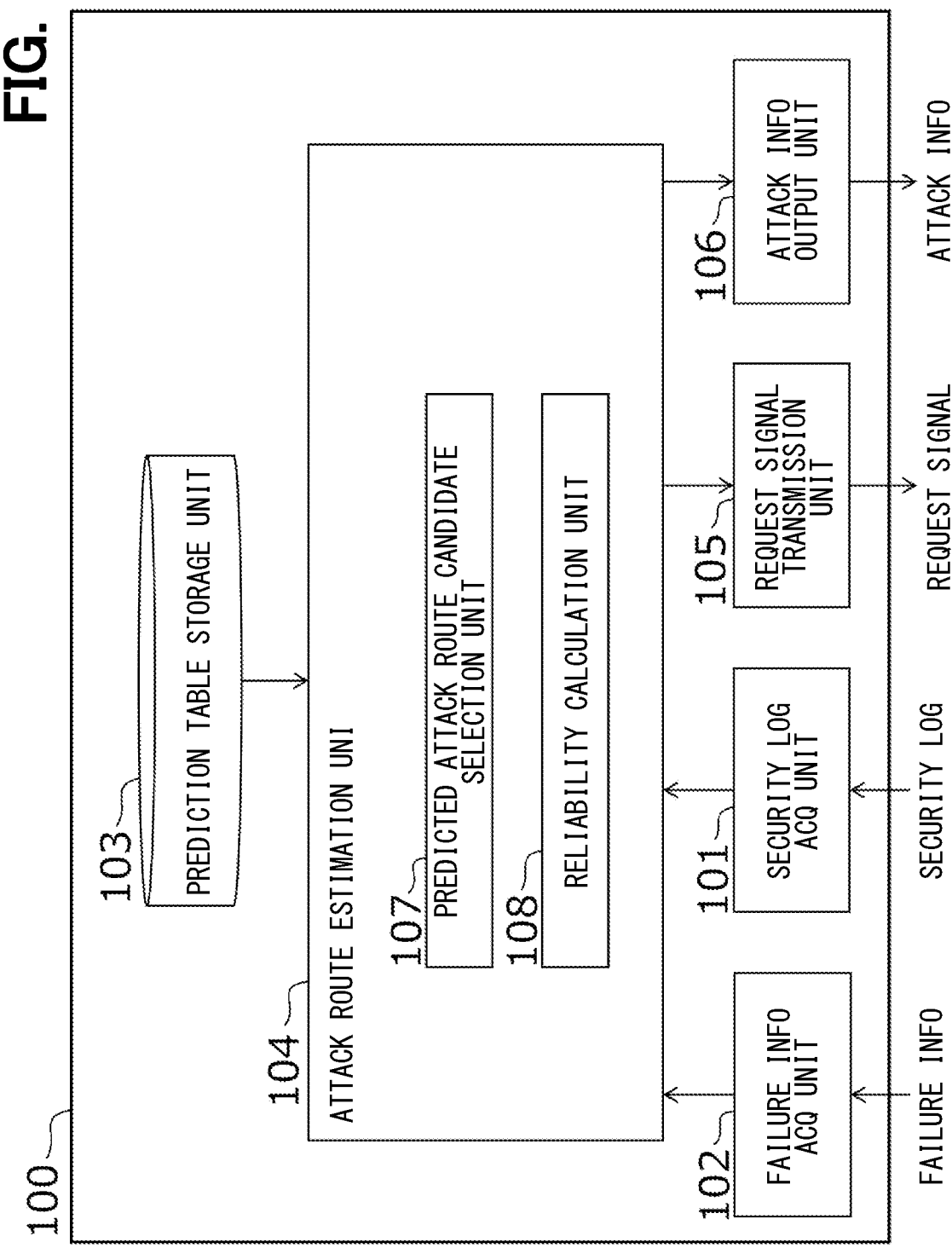
FIG. 3 is a block diagram showing a configuration example of the attack analyzer according to the first embodiment.

The attack analyzer 100 of the present embodiment will be described with reference to FIG. 3. The attack analyzer 100 is a device that detects and analyzes an attack on the electronic control system S described above. The attack analyzer 100 includes a security log acquisition unit 101, a failure information acquisition unit 102, a prediction table storage unit 103, an attack route estimation unit 104, a request signal transmission unit 105, and an attack information output unit 106. Further, the attack route estimation unit 104 includes a predicted attack route candidate selection unit 107 and a reliability calculation unit 108.

When the attack analyzer 100 is provided in a vehicle, it may be provided by connecting to the electronic control system S via an in-vehicle network. Alternatively, the attack analyzer 100 may be provided inside the electronic control system S. For example, the attack analyzer 100 may be provided as a function of CGW 13 or TCU 11.

The attack analyzer 100 may be composed of a general-purpose CPU (Central Processing Unit), a volatile memory such as RAM, a ROM, a flash memory, a non-volatile memory such as a hard disk, various interfaces, and an internal bus connecting them. Software is executed on the hardware, and thus a function of each functional block illustrated in FIG. 3 can be realized. Of course, the attack analyzer 100 may also be realized by dedicated hardware such as LSI.

In the present embodiment, the attack analyzer 100 assumes the form of an electronic control unit (hereinafter abbreviated as ECU) as a semi-finished product, but the attack analyzer 100 is not limited to such device. For example, the form of the attach analyzer 100 is a semiconductor circuit or semiconductor module, the form of a semi-finished product is an electronic control device, an electronic control unit, a system board, and the form of a finished product is a server, a workstation, or a personal computer (PC), a tablet, a smartphone, a mobile phone, a navigation system. Note that the attack analyzer 100 may be composed of a plurality of ECUs in addition to a single ECU.

The security log acquisition unit 101 acquires a security log including an abnormality detection signal generated by a "security sensor" mounted on the ECU constituting the electronic control system S and indicating that the security sensor has detected an abnormality. For example, in the case of the arrangement shown in FIG. 1A, the security log output to the in-vehicle network by the security sensor mounted on the TCU 11, CGW 13, ECU 14 to 17, etc. of the electronic control system S is connected to the in-vehicle network is acquired by receiving it by the security log acquisition unit 101. In the case of the arrangement shown in FIG. 1B, the security sensor mounted on the TCU 11, CGW 13, ECU 14-17, etc. of the electronic control system S outputs the security log to the in-vehicle network, and the security log transmitted from the TCU 11 using wireless communication is received by the security log acquisition unit 101 connected to a network such as the Internet.

Here, the "security sensor" refers to a function of monitoring an electronic control unit (ECU) or a network constituting an electronic control system and outputting a security log when a security event occurs, and the means for realizing the sensor does not matter.

The failure information acquisition unit 102 acquires failure information indicating a "failure" detected by a failure diagnosis device mounted on an ECU constituting the electronic control system S. For example, in the case of the arrangement shown in FIG. 1A, the failure information output to the in-vehicle network by the failure diagnosis device mounted on the TCU 11, CGW 13, ECU 14 to 17, etc. of the electronic control system S is acquired by receiving it by the failure information acquisition unit 102 connected to the in-vehicle network. In the case of the arrangement shown in FIG. 1B, the failure diagnosis device mounted on the TCU 11, CGW 13, ECU 14-17, etc. of the electronic control system S outputs the failure information to the in-vehicle network, and the failure information transmitted from the TCU 11 using wireless communication is acquired by receiving it by the failure information acquisition unit 102 connected to a network such as the Internet.

Here, the "failure" may include not only a physical defect that has occurred in the hardware, but also a defect that has occurred in the software installed in the hardware.

Note that the security log acquisition unit 101 and the failure information acquisition unit 102 may be realized as one acquisition unit.

The prediction table storage unit 103 stores a prediction table showing a correspondence between a predicted attack route identified by a predicted attack start point, a predicted attack target, a relevant (intermediate) ECU en route from the predicted attack start point to the predicted attack target in the electronic control system S, and a predicted abnormality detection signal predicted to be generated by the security sensor. The prediction table may sometimes be called as a pattern matching table or a matching table.

FIG. 4 is a diagram showing an example of a prediction table. The prediction table of FIG. 4 is a table that associates which security sensor mounted on each ECU detects an abnormality when there is an attack on the predicted attack target from the predicted attack start point. In FIG. 4, '1' represents a state in which an abnormality is detected, and '0' represents a state in which an abnormality is not detected. That is, the predicted attack start point, the predicted attack target, and the relevant ECU in FIG. 4 correspond to the "predicted attack route", and 0 or 1 of each security sensor corresponds to the "predicted abnormality detection signal". For example, an event E1 shows a situation in which, when the predicted attack start point is external and the predicted attack target is CGW 13, the security sensors A and B of the TCU 11 detect an abnormality, that is, output a predicted abnormality detection signal. In event E2 and event E3, the predicted attack route and the predicted abnormality detection signal are associated with each other by the same rule.

In the present embodiment, the predicted attack route is defined by the predicted attack start point, the predicted attack target, and the relevant ECU. However, since the relevant ECU can be specified from the predicted attack start point and the predicted attack target, it is possible to identify the relevant ECU from the predicted attack start point and the predicted attack target. Thus, the predicted attack route may be determined by the predicted attack start point and the predicted attack target. Alternatively, the predicted attack route may be determined by preset identification information. In such case, the attack analyzer 100 has a table in which the identification information is associated with the predicted attack start point, the predicted attack target, and the relevant ECU, in addition to the prediction table.

In the present embodiment, the patterns of the predicted abnormality detection signals of the security sensors of the TCU 11, CGW 13, and the ECU 14 are used, but the patterns of the predicted abnormality detection signals of the security sensors mounted on the other ECUs may also be used.

Returning to FIG. 3, the attack route estimation unit 104 estimates, by using the prediction table, the attack route of the attack received by the electronic control system S from the abnormality detection signal included in the security log and the failure information.

Preferably, the attack route estimation unit 104 has a predicted attack route candidate selection unit 107. More preferably, the attack route estimation unit 104 has a reliability calculation unit 108.

The attack route estimation unit 104 of the present embodiment mainly performs two processes for estimating an attack route. The first is the selection of a predicted attack route candidate by the predicted attack route candidate selection unit 107. The second is the calculation of the reliability of the predicted attack route candidate selected in the first process by the reliability calculation unit 108. Both of these two processes are included in the estimation of the attack route. These processes may be executed with other process interposed in between, or may be performed continuously in time (i.e., in series).

The predicted attack route candidate selection unit 107 selects, by using the prediction table, a predicted attack route candidate from the predicted attack routes by comparing the abnormality detection signal and the predicted abnormality detection signal. The reliability calculation unit 108 uses the failure information to obtain the "reliability" indicating the certainty of the predicted attack route candidate.

Here, the "reliability" is sufficient as long as it indicates the degree of certainty, and includes not only the case where it is indicated by a numerical value but also the case where it is indicated by a standardized value or a symbol or a set.

The request signal transmission unit 105 transmits a request signal requesting transmission of failure information to the ECU included in the route of the predicted attack route candidate selected by the predicted attack route candidate selection unit 107.

By configuring each ECU to transmit failure information only when requested by a request signal, the opportunity for transmission and reception of failure information is limited to the timing when an attack on the electronic control system occurs. Further, by transmitting the request signal only to the ECU that may be related to the attack, the failure information of the ECU that has not been attacked will not be transmitted or received. Therefore, it is possible to suppress the network load caused by the transmission and reception of failure information.

The attack information output unit 106 outputs attack information indicating an attack route estimated by the attack route estimation unit 104. Preferably, the attack information output unit 105 outputs attack information, which indicates that the predicted attack route candidate selected by the predicted attack route candidate selection unit 107 serves as an estimated attack route. More preferably, the attack information output unit 105 outputs attack information, which indicates that the predicted attack route candidate selected by the predicted attack route candidate selection unit 107 and the reliability obtained by the reliability calculation unit 108 serve as an estimated attack route.

In the present embodiment, all of the predicted attack route candidates selected by the predicted attack route candidate selection unit 107 are output from the attack information output unit 106 as attack routes, but only a part of the predicted attack route candidates may be output as attack routes. For example, the predicted attack route candidates from the one with the highest reliability to the third may be output as attack routes.

Hereinafter, as an embodiment, a specific estimation method of the attack route estimation unit 104 and the contents of the attack information output by the attack information output unit 106 will be described with reference to FIGS. 5 and 6. FIGS. 5 and 6 are diagrams for explaining a method of selecting a predicted attack route candidate and a method of calculating reliability using the prediction table of FIG. 4.

(a) Example Embodiment 1

The example embodiment 1 is an example of correcting the reliability obtained from the prediction table by using the failure information. Hereinafter, the process will be described with reference to FIG. 5.

It is assumed that the security sensor A of the TCU 11 outputs an abnormality detection signal, and the security log acquisition unit 101 receives this abnormality detection signal. At this time, the predicted attack route candidate selection unit 107 selects an event in which the security sensor A detects the predicted abnormality detection signal from the prediction table by comparing the abnormality detection signal with the predicted abnormality detection signal. In the case of FIG. 5, since the events in which the security sensor A detects the predicted abnormality detection signal are the events E1, E2, and E3, the events E1, E2, and E3 are selected as the predicted attack route candidates.

The request signal transmission unit 105 transmits a request signal requesting failure information to the ECU included in the predicted attack route candidates of the events E1, E2, and E3. In the example of FIG. 5, a request signal is transmitted to the TCU 11, CGW 13, and ECU 14. As an example, it is assumed that the CGW 13 outputs failure information in response to the request signal and the failure information acquisition unit 102 receives the failure information.

The reliability calculation unit 108 obtains the reliability of the predicted attack route candidate selected by the predicted attack route candidate selection unit 107. For example, the reliability calculation unit 108 obtains the reliability in consideration of the ratio of the abnormality detection signal and the predicted abnormality detection signal of each predicted attack route candidate. For example, in the present case, only the security sensor A outputs an abnormality detection signal. Then, the predicted abnormality detection signals of the same ECU as the ECU from which the abnormality detection signal is output are output from the security sensors A and B in the events E1 and E2, whereas only the security sensor A outputs the same in the event E3, thereby indicating a situation that it is more likely that an attack corresponding to the event E3 has been or was carried out. Therefore, the reliability is obtained (i.e., calculated) so that the reliability of the event E3 is higher than the reliability of the events E1 and E2. In the example of FIG. 5, as an example, the reliability of events E1 and E2 is 0.5, and the reliability of event E3 is 0.6. However, these numbers are only an example, and an arbitrary numerical value or arithmetic expression can be used to calculate. Note that in the above-mentioned reliability calculation example, the reliability is calculated by considering only the predicted abnormality detection signal of the same ECU as the ECU from which the abnormality detection signal is output, but the reliability may be obtained further in consideration of the predicted abnormality detection signal of the ECU from which no abnormality detection signal is output.

Further, since the failure information indicating that the failure has occurred in the CGW 13 is acquired, the reliability calculation unit 108 performs a process of increasing the reliability of the predicted attack route candidate including the CGW 13 which is the ECU in which the failure has occurred. In the case of FIG. 5, since the predicted attack route candidates including the CGW 13 in between the predicted attack start point and the predicted attack target are the events E2 and E3, the reliability of the events E2 and E3 is set as a new value which is increased by adding a predetermined value, i.e., a in the present example embodiment 1, to the original reliability set in advance. The predetermined value a may be a constant or a variable that changes depending on the conditions.

The attack information output unit 106 outputs events E1, E2, and E3, which are predicted attack route candidates, as attack information. At this time, the attack information may be output using the reliability of the events E1, E2, and E3 as the attack route.

Next, with reference to FIG. 6, an example of obtaining reliability when a failure occurs in each of a plurality of ECUs and failure information is acquired from each of these ECUs will be described. In this example, it is assumed that a failure has occurred in the ECU 14 in addition to the CGW 13.

In such case, similar to the example of FIG. 5, a is added to the reliability of the events E2 and E3 as a process of increasing the reliability of the predicted attack route candidate including the CGW 13 in the route. Further, a process of increasing the reliability of the predicted attack route candidate including the ECU 14 in the route is performed. In this example, since the only predicted attack route candidate including the ECU 14 from the predicted attack start point to the predicted attack target is the event E3, a process of further adding β to the reliability of the event E3 is performed. The values (α, β) added to the reliability when a failure occurs in a plurality of ECUs may be the same value, or different values may be set for respective ECUs.

In the description of the present embodiment, the reliability is first obtained without using the failure information, and then the reliability is corrected using the failure information. However, the reliability may also be calculated in one process. The same applies to the examples described later.

According to the example embodiment 1, since the reliability is obtained by using the failure information in addition to the conventional abnormality detection signal, the accuracy of estimation by the attack route estimation unit 104 can be improved.

(b) Example Embodiment 2

The present example embodiment is an example of obtaining the reliability according to the content of the failure indicated by the failure information.

As in the example embodiment 1, it is assumed that the security sensor A of the TCU 11 outputs an abnormality detection signal, and the security log acquisition unit 101 receives this abnormality detection signal. Further, it is assumed that the failure diagnosis device of the CGW 13 detects the failure that occurred in the CGW 13 and outputs the failure information, and the failure information acquisition unit 102 receives the failure information.

Here, if the failure indicated by the failure information is a hardware failure caused by aging deterioration, or if the cause of the communication interruption failure is due to the ECU of the communication partner, these failures are highly possibly caused not by an attack. As described above, when it is clear that the failure indicated by the failure information is not caused by the attack, the reliability calculation unit 108 does not perform the process of adding a to the reliability using the failure information. That is, in such case, the reliability (0.5, 0.6) shown in FIGS. 5 and 6 is the reliability of each predicted attack route candidate. Alternatively, a predetermined value may be subtracted from these reliability values to obtain a new reliability.

As another example, the value to be added to the reliability may be changed according to the content of the failure indicated by the failure information. In the example embodiment 1, a new reliability is calculated by adding a predetermined value (α) to the reliability of the predicted attack route candidates including an ECU having a failure in the route. In the example embodiment 2, the value of a changes depending on the content of the failure.

For example, when the content of the failure indicated by the failure information is a failure that is likely to be caused by an attack, the value to be added to the reliability is set to a high value for obtaining the reliability. On the other hand, when the content of the failure is a failure that is unlikely to be caused by an attack, the value to be added to the reliability is set to a low value for obtaining the reliability.

According to the example embodiment 2, since the reliability is obtained according to the content of the failure indicated by the failure information in addition to the conventional abnormality detection signal, the accuracy of estimation by the attack route estimation unit 104 can be improved.

(4) Operation of an Attack Analyzer 100

Figure 7:
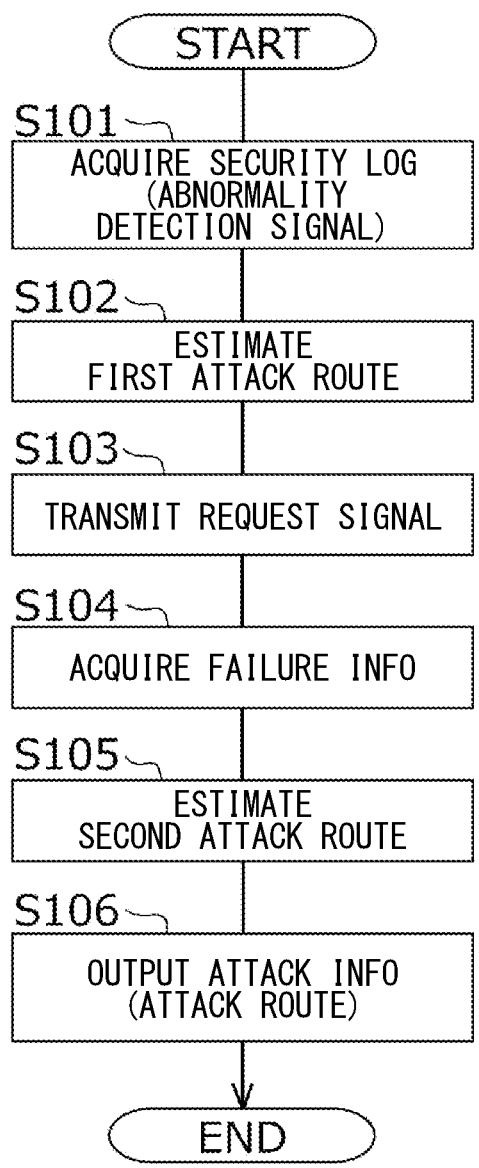
FIG. 7 is a flowchart showing an operation of the attack analyzer according to the first embodiment.

The operation of the attack analyzer 100 will be described with reference to FIG. 7. FIG. 7 not only shows an attack analysis method executed by the attack analyzer 100, but also shows a processing procedure of an attack analysis program that can be executed by the attack analyzer 100. And these processes are not limited to the order shown in FIG. 7. That is, the order may be changed as long as there are no restrictions such as a relationship in which a result of a preceding step is used in a certain step. Hereinafter, the same applies to FIG. 10 in the second embodiment.

The attack analyzer 100 includes a prediction table storage unit (103) for storing a prediction table showing a correspondence between the predicted attach route identified by the predicted attack start point and the predicted attack target in the electronic control system S and the predicted abnormality detection signal predicted to be generated by the security sensor.

A security log (i) generated by a security sensor mounted on an electronic control device constituting the electronic control system S and (ii) including an abnormality detection signal indicating that the security sensor has detected an abnormality is acquired (S101).

The prediction table is read from the prediction table storage unit 103, and the attack route of the attack received by the electronic control system S is estimated from the abnormality detection signal included in the security log acquired in S101, and a first attack route is estimated (S102). Specifically, a predicted attack route candidate is selected from the predicted attack routes stored in the prediction table.

A request signal requesting failure information is transmitted to the ECU included in the predicted attack route candidate selected in S102 (S103). Then, the failure information transmitted from each ECU is acquired in response to the request signal transmitted in S103 (S104). If the failure diagnosis device mounted on each ECU does not detect a failure, the failure information may be not transmitted from each ECU and S104 may be not performed.

The reliability is calculated as an estimation of the second attack route (S105). Here, when the failure information is acquired in S104, the reliability calculation unit 108 calculates the reliability using the failure information. On the other hand, when the failure information is not acquired in S104, the reliability calculation unit 108 calculates the reliability without using the failure information.

Attack information is output, including the predicted attack route candidate selected in S102 and as an estimated attack route whose reliability calculated in S105 (S106).

Note that, in FIG. 7, since the situation is described as a case where the failure information is transmitted only when each ECU receives a request signal, two attack routes are estimated (S102 and S105). However, in a configuration in which the failure information is transmitted as soon as the ECU detects the failure, the failure information can be acquired from the memory in the attack analyzer 100 without transmitting a request signal. Therefore, for example, the attack analyzer 100 can acquire the security log (S101), can acquire the failure information from the memory (S104), and then can collectively estimate the attack routes of S102 and S105.

Further, in the present embodiment, the reliability is calculated by estimating the second attack route in S105. However, the reliability may be calculated in the estimation of the first attack route in S102, and, in the estimation of the second attack route in S105, a process of obtaining a new reliability from the reliability calculated in S102 may be performed by using the failure information.

(5) Summary

As described above, according to the attack analyzer 100 of the present embodiment, when the electronic control system S receives a cyber attack, the reliability of the estimated attack route is calculated by using the failure information output from the electronic control devices constituting the electronic control system S. Since the failure information may indicate a failure that was not detected by the security sensor, by using the failure information for evaluation of the reliability of the attack route, the attack route can be estimated more accurately, compared to the case where only the conventional abnormality detection signal is used. Further, the failure information can also be used to estimate damage situation caused by an attack. For example, it is possible to estimate a situation in which a failure that is not detected by the security sensor has occurred due to the attack, or a situation in which the ECU is operated by an attacker due to the attack.

2. Second Embodiment

In the second embodiment, instead of obtaining the reliability using the failure information, a flag is given to the predicted attack route candidate. Hereinafter, the description of the configuration common to the first embodiment will be omitted, and the differences from the first embodiment will be mainly described.

(1) Configuration of an Attack Analyzer 200

Figure 8:
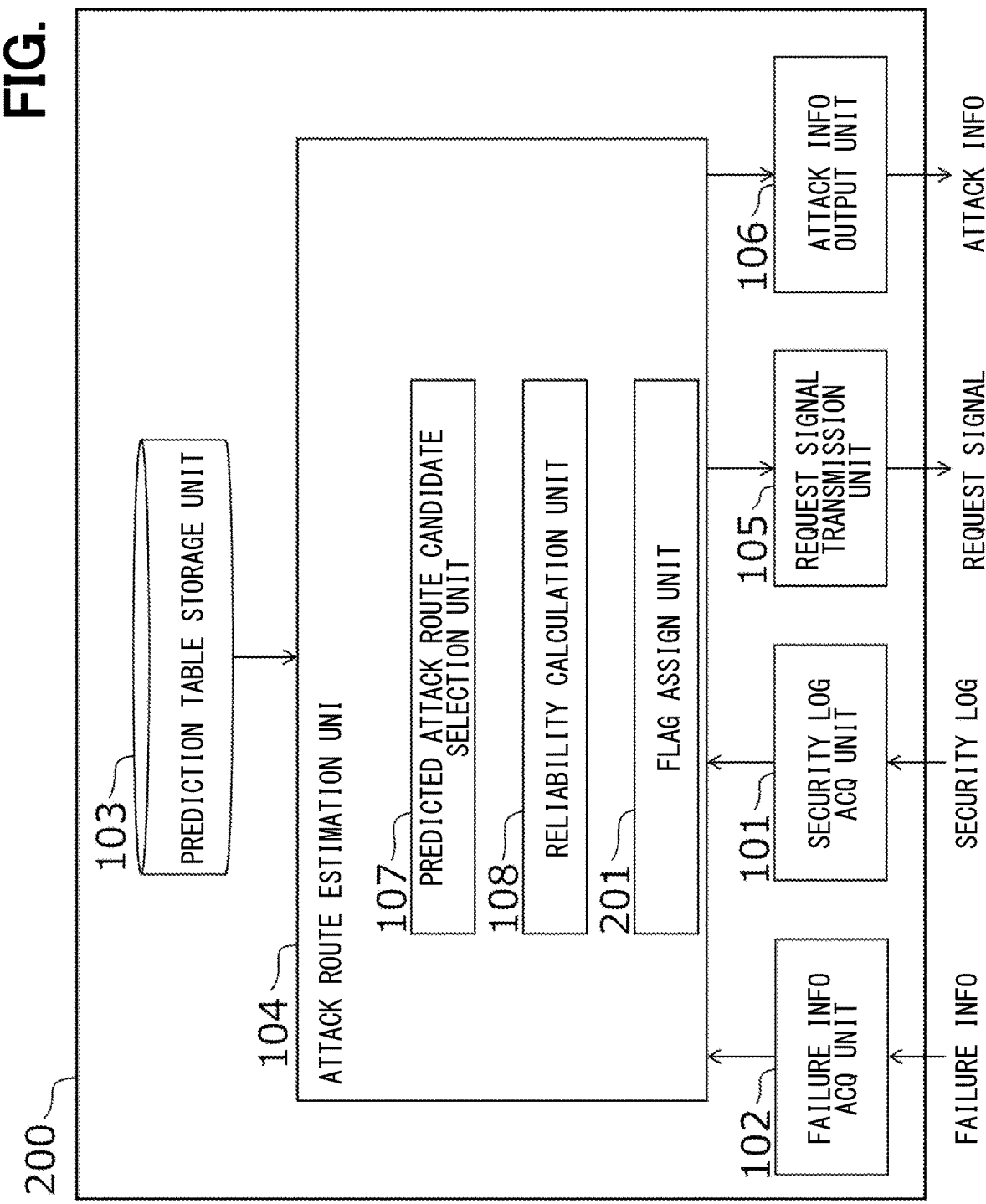
FIG. 8 is a block diagram showing a configuration example of the attack analyzer according to a second embodiment.

FIG. 8 shows the attack analyzer 200 of the present embodiment. As shown in FIG. 8, unlike the first embodiment, the attack route estimation unit 104 of the present embodiment has a flag assign unit 201.

When the failure information acquisition unit 102 acquires the failure information, the flag assign unit 201 assigns a failure flag only to an attack route candidate or candidates including a failure-caused ECU, which is an ECU having a failure indicated by the failure information, among the candidates selected by the predicted attack route candidate selection unit 107.

A method of assigning a failure flag to a predicted attack route candidate will be described with reference to FIG. 9. Similar to the example embodiment 1 and 2 of the first embodiment, it is assumed that the failure diagnosis device of the CGW 13 detects a failure that occurred in the CGW 13 and outputs the failure information, and the failure information acquisition unit 102 receives the failure information. In such case, a failure flag is assigned to the events E2 and E3 in which the CGW 13 is included in the route, i.e., a predicted attack route candidate. In FIG. 9, 1 represents a state in which the failure flag is assigned, and 0 represents a state in which the failure flag is not assigned.

Although FIG. 9 shows an example in which one failure flag is given to each predicted attack route candidate, a plurality of failure flags may be given to one predicted attack route candidate. For example, when a failure occurs in the CGW 13 and the ECU 14, and the failure information output from each of these ECUs is acquired, one failure flag is assigned to a predicted attack route candidate having the CGW 13 in the route, and also one failure flag is assigned to a predicted attack route candidate having the ECU 14 in the route. In such case, two failure flags are assigned to the event E3, which is a predicted attack route candidate in which the CGW 13 and the ECU 14 are included in the route. The attack information output unit 106 outputs attack information, using the predicted attack route candidate and the failure flag as the attack route. Note that the attack information output unit 106 may output the attack information in which reliability is added as an attack route.

In the present embodiment, a configuration has been described in which the reliability will not be calculated by using the failure information when the failure flag is assigned. However, in the present embodiment, the reliability calculation unit 108 may perform a process of obtaining the reliability by using the failure information.

In the present embodiment, regardless of whether or not the failure flag is assigned, the predicted attack route candidate is output from the attack information output unit 106 as the attack route. However, only the predicted attack route candidate to which the failure flag is assigned may be output as an attack route.

(2) Operation of an Attack Analyzer 200

Figure 10:
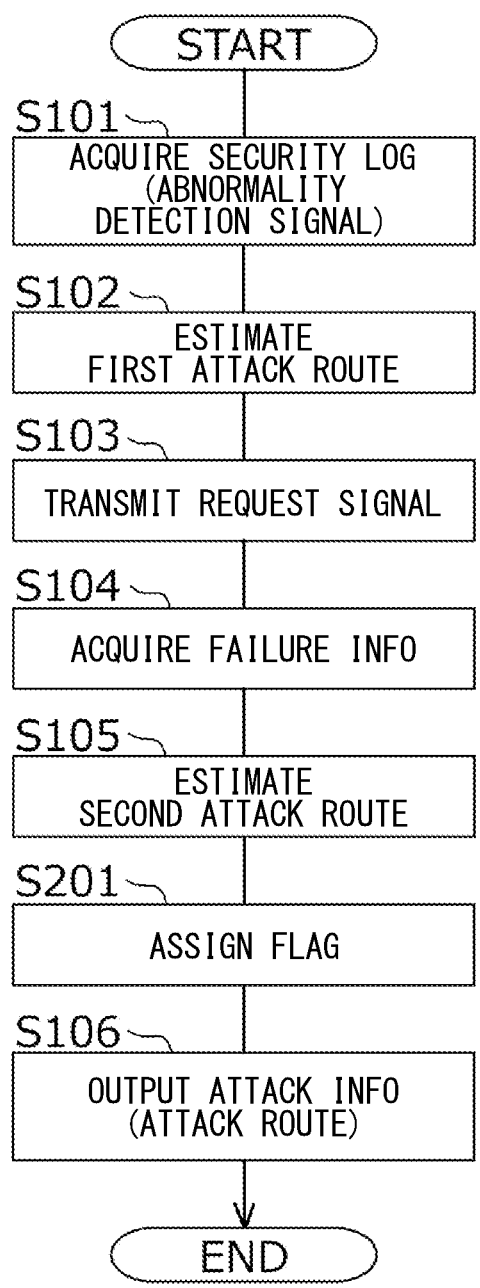
FIG. 10 is a flowchart showing an operation of the attack analyzer according to a second embodiment.

The processing of S101 to S106 shown in FIG. 10 is the same as that of FIG. 7 of the first embodiment. However, as described above, in the estimation of the second attack route in S105, the reliability may be calculated using the failure information as in the first embodiment, or the reliability may be calculated without using the failure information.

Further, in the second embodiment, when the failure information is acquired in S104, a failure flag is assigned to a predicted attack route candidate having an ECU in which a failure indicated by the failure information has occurred (S201).

Then, the attack information is output, using the predicted attack route candidate selected in S102, the reliability calculated in S105, and the failure flag assigned in S201 as an attack route (S106).

(3) Summary

As described above, according to the attack analysis device 200 of the present embodiment, when the electronic control system S receives a cyber attack, a failure flag indicating that a failure has occurred in an ECU included in the predicted attack route candidate is output. When a more detailed analysis of the attack is performed downstream of the attack analyzer 200, it is possible to provide useful information for the detailed analysis as compared with the case where only the attack route is provided.

3. Conclusion

The features of the attack analyzer and the like in the embodiments of the present disclosure have been described above.

Since the terms used in the embodiments are examples, the terms may be replaced with terms that are synonymous or include synonymous functions.

The block diagram used for the description of the embodiment is obtained by classifying and arranging the configurations of the device for each of the functions. Individual function blocks may be implemented by arbitrarily combining hardware and software. Further, since the block diagram illustrates functions, the block diagram can be understood as disclosure of a method and a program that implements the method.

Function blocks that can be understood as processes, flows, and methods described in the respective embodiments may be changed in order as long as there is no restrictions such as a relationship in which results of preceding other steps are used in one step.

The terms such as first, second, to N-th (where N is an integer) used in each of the embodiments and in the claims are used to distinguish two or more configurations and methods of the same kind and are not intended to limit the order or superiority.

Each of the embodiments is provided based on an assumption of providing a vehicle attack analyzer for analyzing a server attack on an electronic control system mounted on a vehicle, but the present disclosure encompasses, unless otherwise limited within the scope of the claims, other dedicated or general-purpose devices.

Further, as an example form of the attack analyzer of the present disclosure, the following can be mentioned. Examples of a form of a component include a semiconductor device, an electronic circuit, a module, and a microcomputer. Examples of a form of a semi-finished product include an electronic control device (i.e., electronic control unit or ECU) and a system board. Examples of a form of a finished product include a cellular phone, a smartphone, a tablet computer, a personal computer (PC), a workstation, and a server. The example forms may further include a device having a communication function and the like, such as for example, a video camera, a still camera, and a car navigation system, for example.

In addition, necessary functions such as an antenna and a communication interface may be added to the attack analyzer.

It is assumed that the attack analyzer of the present disclosure is used for the purpose of providing various services, especially by being used on the server side. For providing such services, the attack analyzer of the present disclosure will be used, the method of the present disclosure will be used, and/or the program of the present disclosure will be executed.

Further, the present disclosure is implemented not only by dedicated hardware having a configuration and a function described in relation to each of the embodiments, but by a combination of (i) a program for implementing the present disclosure, which is recorded on such a recording medium as memory, a hard disk and the like, and (ii) general-purpose hardware including dedicated or general-purpose CPU, memory, or the like, capable of executing the program.

A program stored in a non-transitory, tangible storage medium (for example, an external storage device (a hard disk, a USB memory, a CD/BD, or the like) of dedicated or general-purpose hardware, or stored in an internal storage device (a RAM, a ROM, or the like)) may be provided to dedicated or general-purpose hardware via a recording medium, or from a server via a communication line without using the recording medium. In such manner, it is possible to always provide a latest function by updating the program.

An attack analyzer of the present disclosure includes: a security log acquisition unit acquiring a security log (i) including an abnormality detection signal generated by a security sensor and (ii) indicating that the security sensor has detected an abnormality, the security sensor mounted on an electronic control device constituting an electronic control system; a failure information acquisition unit acquiring failure information indicating a failure occurred in the electronic control device; a prediction table storage unit storing a prediction table showing a correspondence relationship between a predicted attack route in the electronic control system and a predicted abnormality detection signal predicted to be generated by the security sensor; an attack route estimation unit estimating, using the prediction table, the attack route of an attack received by the electronic control system from the abnormality detection signal included in the security log and the failure information; and an attack information output unit outputting attack information indicating the attack route.

INDUSTRIAL APPLICABILITY

The attack analyzer of the present disclosure is mainly intended for or targeting a device that analyzes a cyber attack received by an electronic control system mounted on an automobile, but may also be intended for or targeting a device that analyzes an attack on a normal system that is not mounted on an automobile.

What is claimed is:

1. An attack analyzer comprising a processor and memory configured to implement:

a security log acquisition unit acquiring a security log (i) including an abnormality detection signal generated by a security sensor and (ii) indicating that the security sensor has detected an abnormality, the security sensor mounted on an electronic control device constituting an electronic control system;

a failure information acquisition unit acquiring failure information indicating a failure occurred in the electronic control device;

a prediction table storage unit storing a prediction table showing a correspondence relationship between a predicted attack route in the electronic control system and a predicted abnormality detection signal predicted to be generated by the security sensor;

an attack route estimation unit estimating, using the prediction table, the attack route of an attack received by the electronic control system from the abnormality detection signal included in the security log and the failure information; and an attack information output unit outputting attack information indicating the attack route;

wherein:

the attack route estimation unit includes: a predicted attack route candidate selection unit that selects a predicted attack route candidate from the predicted attack route by comparing the abnormality detection signal with the predicted abnormality detection signal using the prediction table; and a reliability calculation unit that obtains a reliability indicating certainty of the predicted attack route candidate using the failure information;

the attack information output unit outputs the attack information indicating that the predicted attack route candidate and the reliability serve as the attack route; and the reliability calculation unit performs a process of increasing the reliability of the predicted attack route candidate including, in the attack route, the electronic control device in which the failure has occurred.

2. The attack analyzer of claim 1, wherein
the reliability calculation unit calculates the reliability of the predicted attack route candidate including, in the attack route, an electronic control device in which a failure has occurred according to a content of the failure.

3. The attack analyzer of claim 1, wherein
the attack route estimation unit further includes:
a flag assign unit assigning a flag to the predicted attack route candidate including, in the attack route, an electronic control unit in which the failure has occurred, and
the attack information output unit outputs the attack information using the predicted attack route candidate and the flag as the attack route.

4. The attack analyzer of claim 1 further comprising:
a request signal transmission unit transmitting a request signal requesting for the failure information to the electronic control device included in the predicted attack route candidate, wherein
the failure information acquisition unit acquires the failure information from the electronic control device to which the request signal is transmitted.

5. The attack analyzer of claim 1, wherein
the predicted attack route is identified by a predicted attack start point, a predicted attack target, and an electronic control device or devices en route in between the predicted attack start point and the predicted attack target.

6. He attack analyzer of claim 1, wherein
the electronic control system and the attack analyzer are mounted on a movable body.

7. The attack analyzer of claim 1, wherein
the electronic control system is mounted on a movable body, and
the attack analyzer is a server device installed outside the movable body.

8. An attack analysis method performed by an attack analyzer having a prediction table that shows a correspondence relationship between a predicted attack route in an electronic control system and a predicted abnormality detection signal predicted to be generated by a security sensor, the attack analysis method comprising steps of:
acquiring a security log including an abnormality detection signal generated by the security sensor and indicating that the security sensor has detected an abnormality, the security sensor mounted on an electronic control device constituting the electronic control system;
acquiring failure information indicating a failure occurred in the electronic control device;
reading the prediction table and estimating the attack route of an attack received by the electronic control system from the abnormality detection signal included in the security log and the failure information; and
outputting attack information indicating the attack route and indicating that the predicted attack route candidate serves as the attack route;
wherein:
estimating the attack route includes selecting a predicted attack route candidate from the predicted attack route by comparing the abnormality detection signal with the predicted abnormality detection signal using the prediction table and obtaining a reliability indicating certainty of the predicted attack route candidate using the failure information;
the attack information output unit outputs the attack information indicating that the predicted attack route candidate and the reliability serve as the attack route; and
performing a process of increasing the reliability of the predicted attack route candidate including, in the attack route, the electronic control device in which the failure has occurred.

9. A non-transitory, computer-readable, storage medium storing instructions that, when executed by one or more processors, perform an attack analysis process, wherein the attack analysis process includes:
controlling an attack analyzer having a prediction table that shows a correspondence relationship between a predicted attack route in an electronic control system and a predicted abnormality detection signal predicted to be generated by a security sensor,
acquiring a security log including an abnormality detection signal generated by the security sensor and indicating that the security sensor has detected an abnormality, the security sensor mounted on an electronic control device constituting the electronic control system;
acquiring failure information indicating a failure occurred in the electronic control device;
reading the prediction table and estimating the attack route of an attack received by the electronic control system from the abnormality detection signal included in the security log and the failure information; and
outputting attack information indicating the attack route and indicating that the predicted attack route candidate serves as the attack route;
wherein:
estimating the attack route includes selecting a predicted attack route candidate from the predicted attack route by comparing the abnormality detection signal with the predicted abnormality detection signal using the prediction table and obtaining a reliability indicating certainty of the predicted attack route candidate using the failure information;
the attack information output unit outputs the attack information indicating that the predicted attack route candidate and the reliability serve as the attack route; and
performing a process of increasing the reliability of the predicted attack route candidate including, in the attack route, the electronic control device in which the failure has occurred.

* * * * *